United States Patent
Lockhart et al.

[11] Patent Number: 6,154,532
[45] Date of Patent: Nov. 28, 2000

[54] CHARGE MINIMIZING CALLBACK SYSTEM

[75] Inventors: Dave M. Lockhart; James E. Holstine, Jr., both of Chattanooga, Tenn.

[73] Assignee: Transcommunications Incorporated, Chattanooga, Tenn.

[21] Appl. No.: 08/974,594

[22] Filed: Nov. 19, 1997

[51] Int. Cl.[7] .................................................. H04M 17/00
[52] U.S. Cl. ........................ 379/143; 379/142; 379/112; 379/114; 379/246
[58] Field of Search .................................... 379/142–143, 379/112–114, 118, 120, 127, 133–134, 201, 245–247, 229, 243, 111, 207

[56] References Cited

U.S. PATENT DOCUMENTS

| | | | |
|---|---|---|---|
| 5,027,387 | 6/1991 | Moll | 379/112 |
| 5,155,761 | 10/1992 | Hammond | 379/67 |
| 5,181,236 | 1/1993 | LaVallee et al. | 379/142 |
| 5,627,884 | 5/1997 | Williams et al. | 379/88 |
| 5,646,839 | 7/1997 | Katz | 379/142 |
| 5,745,559 | 4/1998 | Weir | 379/188 |
| 5,832,072 | 11/1998 | Rozenblit | 379/142 |
| 5,867,562 | 2/1999 | Scherer | 379/127 |
| 5,883,942 | 3/1999 | Lim et al. | 379/142 |

OTHER PUBLICATIONS

Dialog search of world Patent Index pp. 1–15 done on Oct. 29, 1997.

Primary Examiner—Duc Nguyen
Attorney, Agent, or Firm—Luedeka, Neely & Graham, P.C.

[57] ABSTRACT

A device and method minimize telephone charges by not answering the destination telephone when an incoming call is detected. Preconnection information such as dialed number identification system (DNIS) information, phone type information digits, and automatic number identification (ANI) information is automatically provided by the public switched telephone network to the destination telephone in response to the incoming call. The preconnection information is examined to determine if the rate structure is such that it would be more desirable to have the call billed as if it originated from the destination telephone or from the source telephone. If it is less expensive to have the call originate from the source telephone, the call is answered. If it is less expensive to have the call originate from the destination phone, a signal is sent to the user prompting them to hang up. When the caller hangs up, a return call is placed to the number and the caller answers. A slight modification of the method and device can be utilized to operate a cost efficient calling card system. The preconnection information is received at a central station without answering the telephone and a return call is placed. The caller then enters the number they wish to call. The central station then connects the caller to the number. In accordance with the invention, callers can also be prompted to enter an identification code to insure they are authorized to use the system.

34 Claims, 6 Drawing Sheets

6,154,532

CHARGE MINIMIZING CALLBACK SYSTEM

FIELD OF THE INVENTION

The present invention is directed to a method and apparatus for minimizing the cost of telephone calls by examining the preconnection information received in response to an incoming call and calling back the telephone from which the incoming call was placed.

BACKGROUND AND SUMMARY OF THE INVENTION

When a telephone number is dialed, certain information is sent through the telephone network before a chargeable connection is established. The type of information sent through the network depends upon which particular network is transmitting the call. Typically, this information at least includes the number which was dialed, the type of phone from which the call was made, and the number from which the call was dialed. However, a variety of additional information may also be sent through the network. Often, the network provider will allow a customer to specify the type of information they wish to receive in response to an incoming call when the customer orders their service. The information is also provided to allow the networks to initiate setup of a call and provide a plethora of other services such as caller ID, customer billing, and call routing. For example, by reading the preconnection information, caller ID allows a telephone user to know the phone number from which a call was made without answering the phone.

Based on the preconnection information, methods have been devised that allow an individual making a international call between two foreign countries to be billed as if the call had originated in the United States. For example, consider one procedure for making a international call from Germany to Korea. From your telephone in Germany, you dial a callback number in the U.S. and hang up after a couple of ringbacks. The callback system then calls you back and you enter the number in Korea you wish to call. The callback system then dials the number in Korea and you are connected. The cost of the call is calculated at the rate of a call from the United States to Germany plus the rate from the United States to Korea. Because of the relatively inexpensive phone rates in the United States, the cost of the international call placed in accordance with the above method is often substantially less than the cost of a direct international call.

The cost of a domestic long distance telephone call also depends in part upon the location and type of the telephone from which the call originated. Thus, in many instances, the cost of a long distance call from party A to party B will often be substantially different than the cost of a call from party B to party A. For example, the rate charged for a long distance call made from a pay phone to an individual will cost more than a phone call from the individual to the pay phone. Likewise, charges for calls originated from cellular phones are typically higher than charges for calls originated from standard phones.

Pay phone per usage charges are incurred when a call is placed from a pay phone to certain numbers. Typically, these numbers include toll free numbers such as 1-8xx numbers, access code calls such as 10-xxx numbers, and calling card numbers. However, due to the rapidly changing nature of the deregulated phone system, it is anticipated that the types of numbers to which the per usage charges are applied may be expanded.

Calling cards, prepaid or otherwise, allow a caller to call a number that represents their service provider. The caller then inputs the number that they wish to call and an identification number identifying their account and the service provider connects the call. However, the call is initiated from the location of the caller that calls the service provider. Thus, if the caller is at a pay phone, a per call pay phone usage surcharge is owed to the pay phone service provider.

Long distance calls placed from a cellular phone to another party generally result in high long distance charges. Sometimes the call could be completed less expensively, if the call was originated from a location other than the cellular phone. However, the cellular phone caller can not tell the party they wish to call to call them without completing a call to the party and, thereby, incurring long distance charges.

Therefore, what is needed is a method and device that allows a domestic caller wishing to place a telephone call from a relatively expensive location to a relatively inexpensive location to automatically initiate a call from the less expensive location to the more expensive location.

The present invention overcomes the deficiencies of the prior art by providing a method of minimizing phone charges for calls between numbers that are made in accordance with the North American Dialing Plan (NADP). The NADP is sometimes also referred to as the North American Numbering Plan (NANP). The NADP divides the participating countries into area codes, each of which is a three digit number. Within each area code, a telephone number is always seven digits, except for special codes like the 911 emergency number. For our purposes, all calls made in accordance with the NADP will be considered domestic calls. The method entails receiving preconnection information transmitted to a domestic callee's telephone line in response to an incoming call from a domestic caller. The terminology used in the telecommunications industry varies immensely. For our purposes, "telephone line" is used to refer to the connection to the public switched telephone network provided to a customer by a phone service provider. The preconnection information received on the domestic callee's telephone line is examined to determine the caller's telephone number without answering the incoming call. If the examination of the preconnection information indicates that it would be less expensive to place a return call than to answer the incoming call, the domestic call is not answered and a return call is automatically placed by dialing the domestic caller's telephone number. If an examination of the preconnection information reveals that it would be more cost effective to simply answer the incoming domestic call, the domestic call is answered.

Thus, the present invention overcomes the deficiencies of the prior art by providing a means for placing a telephone call from a pay phone to a second location that allows the call to be initiated from the second location. By initiating the call from the second location, the system minimizes the connection charges. Furthermore, by initiating the call from the second location, the method allows the call to be billed to the phone number or calling card at the second location and permits the person making the call at the pay phone to complete the call without invoking a pay phone per usage charge.

In accordance with a particularly preferred method of the present invention, phone charges are minimized by receiving preconnection information transmitted to a callee's toll free telephone line in response to an incoming call from a caller. The preconnection information is examined to determine the caller's telephone number without answering the incoming call. The preconnection information is also examined to determine whether or not the incoming call was placed from a pay phone without answering the incoming call. If it is determined that the incoming call was not placed from a pay phone, the call is completed. If it is determined that the incoming call was placed from a pay telephone, the call is not completed and a return call is placed by dialing the caller's telephone number.

In one form of a preferred embodiment, when the caller answers the return call, the caller is prompted to enter an identification code. The identification code is verified to insure that it corresponds to an authorized caller. An alarm, such as a standard telephone ring, is produced that indicates a return call has been made and when the desired party answers the alarm, the call is completed. The call is then timed and an account corresponding to the identification code is charged an amount that is proportional to the amount of time the caller is connected.

The aforementioned preferred embodiment is an improvement over the prior art in that it allows the provider of the toll free line to avoid the per use charge imposed by pay phone service providers on toll free lines. Furthermore, by use of a toll free line, the initial call can generally be placed from a pay phone without the need to deposit any money whatsoever. This can be extremely beneficial in certain circumstances. For example, trucking companies often operate out of a central location and it is necessary for the truck drivers to routinely contact the central office to check in and receive assignments. Using the present invention, the truck drivers can simply contact the central office's toll free number from any pay phone without establishing a connection, receive a callback, and communicate with the central office without incurring the high charges associated with pay phones or the per use charge associated with a toll free line. Thus, the aforementioned method is a considerable improvement over the prior art.

In another preferred method of the present invention, the preconnection information at least includes data representing dialed number identification service (DNIS) data, information digits identifying the type of the caller phone, and automatic number identification (ANI) information. However, the preconnection information may also contain a variety of other additional information.

In accordance with other preferred methods of the present invention, the identification code is entered either by pressing numbers on the keypad of the caller's telephone corresponding to the identification code, dialing a number on the caller's telephone corresponding to the identification code, or speaking the identification code into the caller's telephone.

In another preferred method, a calling card system is operated by receiving a telephone call from a caller and examining the preconnection information to determine a telephone number from which the telephone call was made. The telephone call is not answered. A return call is placed to the telephone number from which the telephone call was received. The party answering the phone is prompted to enter an identification code and the identification code is received. The entered identification code is verified to insure it corresponds to an authorized user. The party answering the phone is prompted to enter a telephone number that the party wishes to call. The party is connected to the telephone number that they entered, and an account associated with the identification number is charged a fee. The charged fee is proportional to the amount of time the party is connected to the telephone number the party entered. Additionally, after the original connection between the caller and the calling card company is made, the caller can place another call by entering another phone number without breaking the established connection and repeating the above discussed procedure.

In yet another preferred method, the caller is signaled that the telephone number from which the telephone call was made was received and that the caller may hang up the receiver.

The methods discussed above are a significant improvement over the prior art because they result in no per call pay phone usage charge and lower long distance rates. Thus, an individual using a calling card that is operated in accordance with the above described method will realize substantial monetary savings over calling cards operated in accordance with traditional practices. Furthermore, the individual using the calling card usually does not need any money to initiate the calling process.

In accordance with another preferred embodiment, a device is provided for minimizing phone charges. The device includes a telephone line and a processing means. The processing means receive preconnection information on the telephone line in response to an incoming domestic call from a caller on the telephone line, examine the preconnection information to determine a number corresponding to a telephone from which the incoming domestic call was initiated without answering the incoming domestic call, and dial the number corresponding to the telephone from which the incoming domestic call was initiated.

In accordance with a particularly preferred embodiment, a digital computer is provided for receiving an identification code input by the caller, determining the identification of the caller based on the identification code, and examining the preconnection information to determine if the incoming domestic call was placed from a pay telephone. The digital computer may also have a voice recognition system for receiving the identification code.

In accordance with another preferred embodiment of the present invention, an apparatus for minimizing phone charges is provided. A telephone line is connected to a call management system, such as a PBX, that receives incoming calls and routes the calls to the desired destination.

Processing means receive preconnection information in response to an incoming telephone call that contains automatic number identification, dialed number identification service, and phone type information. The dialed number identification service information is examined to determine the number to which the incoming call should be connected. The automatic number identification information is examined to determine the telephone number from which the incoming call was placed. A return call is placed to the number from which the incoming call was placed without answering the incoming call. Optionally, processing means prompt the person who answers the return call to enter an identification code, and after the identification code is received, it is verified that the identification code is assigned to an authorized user. The return call is connected to the telephone number to which the incoming call should be connected.

The call management system of the present invention improves the prior art by allowing all incoming calls to be charged as if they originated from inside the called parties system. For example, a company that has a substantial number of employees which need to travel would benefit significantly from the present invention. The employees could call a particular department or employee at the home office from a pay phone, enter a code corresponding to themselves, and shortly thereafter receive a call from that department or employee at the pay phone. The call would be charged as if it had been originated from the home office and, thus, the company would realize substantial savings.

In accordance with another preferred embodiment, the incoming call originates from a cellular phone.

In accordance with another preferred embodiment, the ANI information is examined to determine if the call is being placed from a number that warrants blocking the call or answering the call.

In accordance with yet another preferred embodiment of the present invention, the telephone line is equipped to operate as a toll free number.

In accordance with yet another preferred embodiment, an incoming call notification alarm indicates that an incoming call was detected and a return call has been placed.

In yet other preferred embodiments, a digital computer or processing means signals the caller that the preconnection information was received by transmitting a tone or a voice message. Additional signals, such as a blinking light, could be employed in special situations such as where it is desirable to produce a silent alarm or to signal the hearing impaired.

BRIEF DESCRIPTION OF THE DRAWINGS

Further advantages of the invention will become apparent by reference to the detailed description of preferred embodiments when considered in conjunction with the following drawings wherein.

DETAILED DESCRIPTION OF THE PREFERRED EMBODIMENTS

Figure 1:
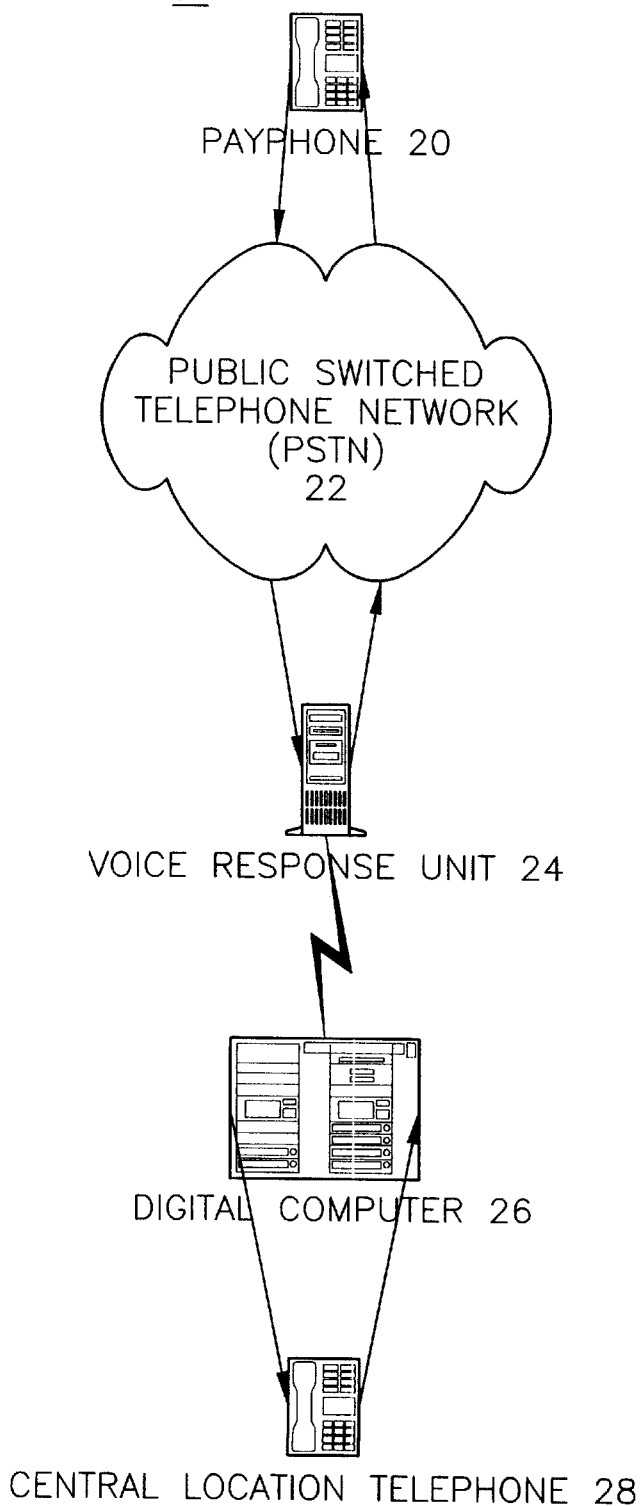
FIG. 1 is a functional diagram of a first embodiment of the charge minimizing callback system.

Several factors influence the cost of a long distance call. One obvious factor is the duration of the call. Thus, a ten minute call to any given location is more expensive than a five minute call to same location. Another factor that influences the cost of a long distance call is the distance between the location from which the call is made and the location to which the call is going. For example, a call from Los Angeles to Las Vegas is generally less expensive than a call from Los Angeles to Miami. Yet another factor in the cost of a long distance call is the time of day at which a call is made. A call placed during peak hours when the use of the network is at a maximum is generally more expensive than a call placed at a time when fewer calls are being made. A less intuitive, but equally influential, factor is the location from which a call was placed. For example, suppose one caller had a long distance plan that charged ten cents a minute and a second caller had a long distance plan that charged five cents a minute. If the first caller calls the second caller, the rate for the long distance call would be ten cents a minute. If the second caller called the first caller, the rate for the long distance call would be five cents a minute. Per use charges are also factors that influence the cost of a long distance telephone call. A pay phone is a phone that results in a per use surcharge. For example, under new federal regulations, pay phone service providers charge the provider of a toll free service, such as a 1-8xx number, a connection charge, typically about 28.4 cents, for connecting an incoming call from a pay phone. In addition, the multitude of factors discussed above vary from one long distance provider to another. Thus, the following factors are discussed only for illustration purposes and it should be readily appreciated that there are many more factors that influence the rate charged for a long distance telephone call. As can be seen from the variety of factors that are taken into consideration when determining the charge for a long distance call, the manner in which a call is made can have a substantial effect on the overall cost of the call.

Additional charges arise from the manner in which a call is billed. When a party desires to have a particular account billed for a call from a third party phone, they typically place a collect call. Collect calls can be completed in a variety of fashions. For example, an operator can be contacted by dialing zero. The operator then comes on the line and request that the caller verbally, or by means of a key pad, inform the operator of the number to be dialed. The operator then establishes a connection with the desired party and ask them if they agree to pay the charges. This method of completing a collect call results in relatively high operator assistance charges and additional high rates based on the duration of the call. Often this operator assisted method is automated, however, the high rates still apply. Charges for a phone call from a third party phone can also be billed to a particular account by means of a calling card. To use a calling card, a caller dials a particular number associated with the calling card. Typically, the calling card number is followed by the number that the caller wishes to dial and a personal identification number (PIN) associated with the caller's billing account. However, it should be appreciated that different calling card systems may require different information to be entered in any of a variety of different formats. The connection is then made from the telephone at which the call was made to the call management system of the calling card company. From the call management system of the calling card company, the call is connected to the number the caller desires to dial. In accordance with this approach, charges are still based upon the type of telephone from which the call originated. Thus, phone calls made from a pay phone will still be subject to the higher rates associated with their use. Furthermore, the per use charge for a pay phone will be incurred if the call originates from a pay phone.

From the discussion above, it can be seen that a multitude of factors influence the amount charged for a long distance telephone call.

Referring now to FIG. 1, a charge minimizing callback system 11 is shown that represents the present invention. The charge minimizing callback system 11 is particularly useful in situations where, as previously discussed, a large number of callers need to reach a central location telephone 28 from a variety of distant locations. This is because the present invention allows a call to be placed from any pay phone 20 without incurring the relatively high line charges normally associated with their use. It should be appreciated that the system of FIG. 1 can be utilized to reduce long distance charges in any situation where an incoming telephone call would be more expensive if it is billed as if it originated from the source phone, such as pay phone 20 in FIG. 1, than it would be if it is billed as if it originated from the destination phone, such as central location telephone 28 in FIG. 1.

In accordance with the method of FIG. 1, a call is placed from a pay phone 20 to a central location telephone 28. When the caller at the pay phone 20 dials the number representing the party they wish to contact, the signal is first received by the public switched telephone network (PSTN) 22. The PSTN 22 generally consists of the public telephone lines, local exchange carrier (LEC) switches, and interexchange carrier (IXC) switches. The signal generated from the pay phone 20 prompts the PSTN 22 to generate a signal that is sent to the location represented by the dialed number. In FIG. 1, this location is the central location telephone 28. Certain subscription services offered by the network providers allow customers to receive additional information concerning the incoming call to the central location telephone 28. Typically, this information includes automatic number identification (ANI) information, two digits representing the type of telephone from which the call was placed, and dialed number identification service (DNIS) information. ANI information is a subscription service that contains data representing the number of the telephone from which the call was placed. This is the information that is used to provide telephone services such as caller ID. The ANI information may be referred to by other names, such as CNI (caller number identification), but the content is the same. Some information, such as the telephone type digits, is required by law to be provided to the subscriber. This telephone type information represents the type of phone from which the incoming call was placed. For example, an "07" denotes the call was placed from a coin operated pay phone. Similarly, a "27" denotes the call was placed from a pay phone that does not accept coins. Finally, the DNIS information represents the number that the individual that placed the call dialed. The particular order in which the above discussed information is sent and the particular terminology used to refer to it depends upon the network protocol of the particular long distance carrier that provides the telephone service. However, the content of the information remains basically the same.

The charge minimizing callback system 11 of FIG. 1 uses the ANI number identification information and phone type information digits to make certain decisions concerning the incoming phone call. The signal containing this information is received from the PSTN 22 by a digital computer 26. The digital computer 26 examines the phone type data to determine the type of phone 20 from which the telephone call was placed. The charge minimizing callback system 11 can be configured in a variety of ways. In one embodiment, the charge minimizing callback system 11 places a return call regardless of the type of telephone from which the call was placed. This embodiment allows callers from any location to automatically bill their calls to the central location 28 and still results in the lower line charges associated with the charge minimizing system 11. In another particularly preferred embodiment, the charge minimizing callback system 11 only places return calls in response to incoming calls that originate from a pay phone 20. This is because pay phone rates and per use charges are generally high and, thus, are desirable charges to avoid. In accordance with this latter embodiment, if the digital computer 26 determines from an examination of the phone type code that the incoming call was placed from a pay phone, it records the number contained in the ANI data. This number represents the number of the pay phone 20 from which the call was placed.

After the digital computer 26 receives the ANI and phone type data indicating the telephone call originated from a pay phone 20, it does not answer the call. Instead, the digital computer 26 then waits for the phone to quit ringing. Alternatively, the digital computer 26 can signal the caller to hang up by transmitting a tone or beep. In an especially preferred embodiment a voice response unit 24 sends a voice message that indicates to the caller the preconnection information has been received. In some situations, transmitting a message without connecting the call is possible due to the manner in which the phone system is set up. A call is not chargeably connected until the telephone at the number dialed sends a network answer supervision (NAS) code that indicates it has been answered. Some network providers prohibit the sending of voice messages before the connection code is transmitted, others do not. However, it should be appreciated that it is not necessary to send a signal indicating the preconnection information has been received. The caller can simply allow the phone to ring a couple of times and hang up. The preconnection information should be transmitted before the second ring occurs.

Once the incoming call from the pay phone 20 has ceased attempting to connect to the central location telephone 28 an outgoing call is initiated by the digital computer 26 to the pay phone 20. This outgoing call prompts the pay phone 20 to ring. When a person answers the pay phone 20, the voice response unit 24 prompts the individual to input an identification code. Voice response units 24, also known as interactive voice response units, are used to provide information to callers without having a person answer the phone. The voice response unit 24 prompts the person that answers the phone to input the identification code by playing a voice message that instructs the user to enter the identification code. Conversely, in an embodiment that does not have a voice response unit 24, the digital computer 26 could simply transmit a tone that the user would recognize as indicating it was time to enter the identification code. Similarly, the identification code can be entered in a variety of ways. The caller could enter the code by pressing the keys of the pay phone 20. However, some pay phones disable their keys. Thus, the digital computer 26 is preferably equipped with a voice recognition system that allows the identification code to be entered by the caller simply speaking the code. Voice recognition systems are widely used to convert speech into a form that is readable by digital computers 26. It should be understood that the original caller is not necessarily a person. The present invention comprehends that the incoming telephone call may have been instigated by a computer and that the computer may enter the identification code in response to being prompted to do so.

Once the digital computer 26 receives the identification code, the digital computer 26 verifies that the code corresponds to a user that is authorized to use the charge minimizing callback system 11. If the entered identification code does not correspond to an authorized code, the digital computer 26 hangs up on the unauthorized caller. If the digital computer 26 verifies that an authorized identification code has been received, it produces a signal, such as a standard telephone ring, that indicates a call has been placed to the central location telephone 28. When the central location telephone 28 is answered, the call is connected.

Since long distance charges are incurred when the return call is answered, it may be desirable to prevent certain phones from instigating a callback. In accordance with the present invention, the digital computer 26 can be programmed to examine the ANI information and not place return calls to certain telephone numbers. The digital computer 26 can also be programmed to automatically answer calls from certain numbers thereby causing the long distance charges to be billed to the calling party.

The benefit of the embodiment of the charge minimizing callback system of FIG. 1 is that the call is billed as if it was initiated from the central location telephone 28. Thus, no pay phone charges are incurred. Furthermore, the line charges are incurred as if the call originated from the central location telephone 28. Finally, because all charges are billed to the account associated with the central location telephone 28, it is generally not necessary that the caller at the pay phone 20 deposit any money.

Figure 2:
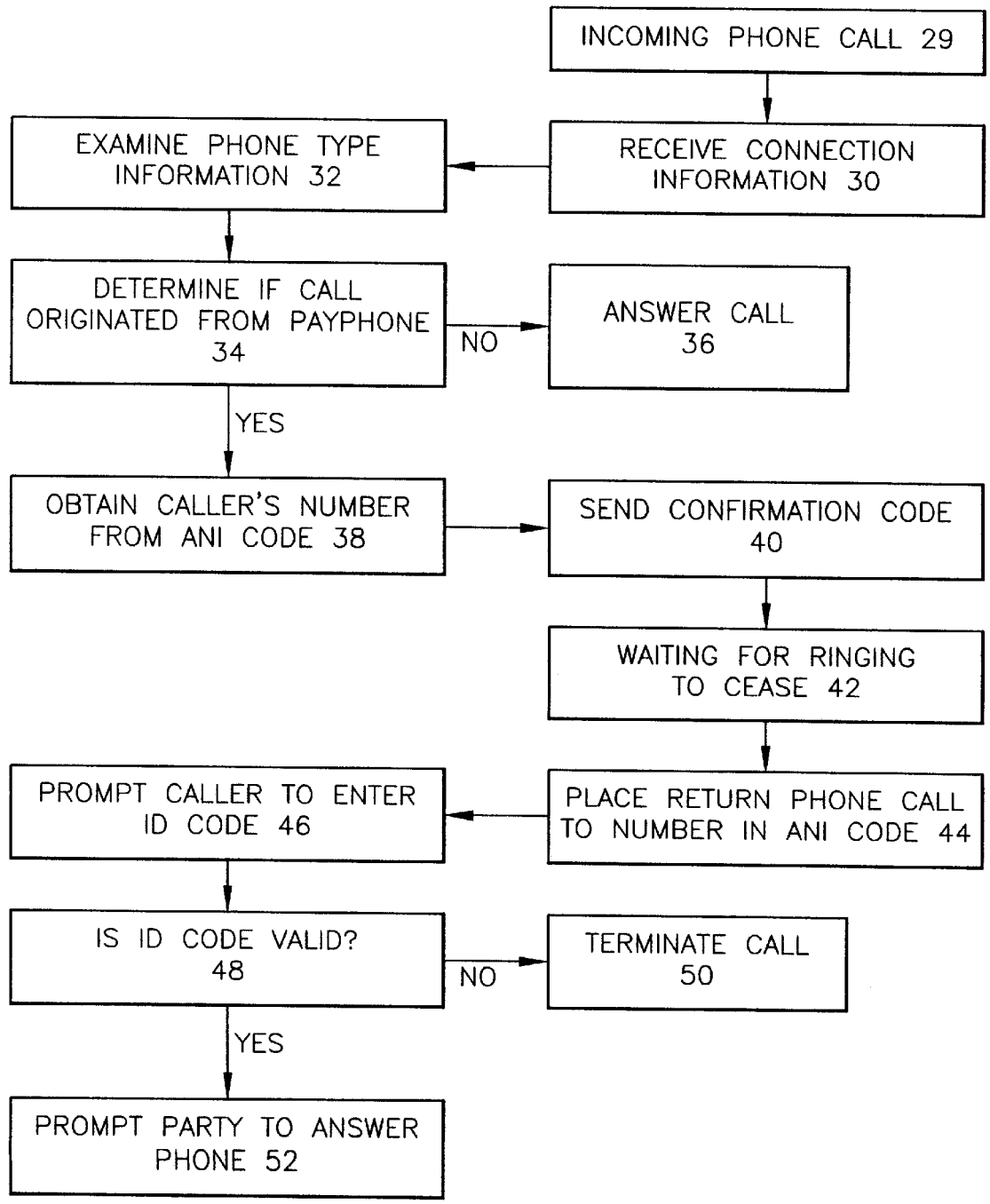
FIG. 2 is a visual representation of a first method embodying the charge minimizing callback method.

FIG. 2 is a visual representation of the steps of a method in accordance with the present invention. The first block 29 represents the first step of the method which is the placing of a phone call to a location that is practicing the charge minimizing callback method 12. Once the phone call is made, the preconnection information is received in block 30. In block 32, the phone type information is examined to determine from what type of phone the incoming call originated. In decisional block 34, it is determined whether or not the incoming call originated from a pay phone. As previously discussed, there are several types of pay phones and it is up to the user of the charge minimizing callback method 12 to decide what types of pay phones will be called back in accordance with the method. If the incoming call did not originate from a pay phone, the method falls to block 36 wherein the incoming call is answered and the method terminates. If the incoming call did originate from a pay phone, the method falls to block 38 wherein the ANI code is obtained from the preconnection information. As shown in block 40, a confirmation signal is sent to the pay phone to indicate to the caller that the preconnection information has been received. The method then falls to block 42 and waits for the ringing from the incoming telephone call to cease. Once the ringing ceases, the number obtained from the ANI information is called in accordance with the step of block 44. The person who answers the phone is then prompted to enter an identification code as shown in block 46. In decisional block 48, it is determined if the entered identification code corresponds to an authorized account. If the identification code does not correspond to an authorized account, the method proceeds to block 50 wherein the call is terminated, or otherwise appropriately handled. If the identification code does correspond to an authorized account, the method proceeds to block 52 wherein a signal is generated to inform the desired party that an incoming call has been received in accordance with the charge minimizing callback method 12. When the desired party answers the phone, the call is connected.

Several variations of the above method are contemplated by the present invention. For example, if an invalid identification code is entered, the user could be provided additional opportunities to enter a valid code before the method terminates the call. Similarly, it should be understood that the method further contemplates the step of disconnecting the call when either party hangs up after the initial connection.

Figure 3:
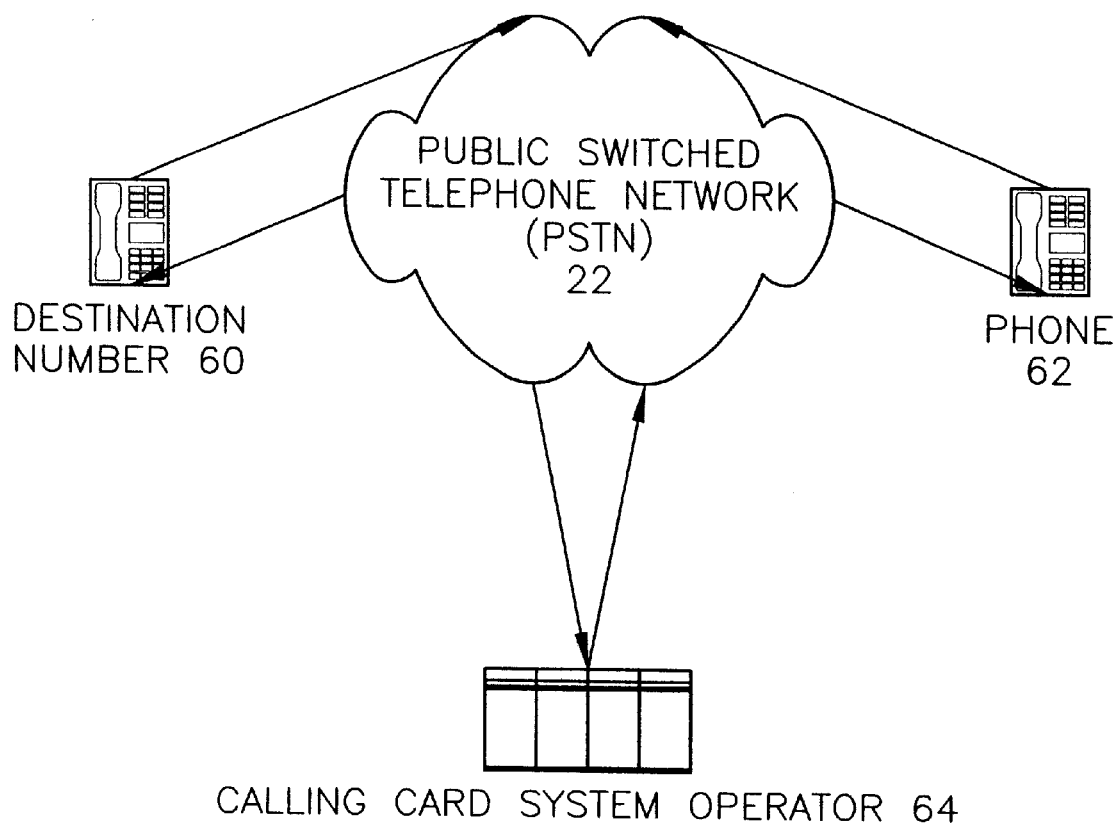
FIG. 3 is a functional diagram of a second embodiment of the charge minimizing callback system.

FIG. 3 is a functional diagram of a second embodiment of the charge minimizing callback system. The embodiment envisions a charge minimizing callback calling card system 13. A call is placed by dialing a number corresponding to the calling card system operator 64. Once the phone call is made, the preconnection information is received by the calling card system operator 64. The ANI code is obtained from the preconnection information received by the calling card operator 64 in response to the incoming call. As previously discussed, this provides the calling card operator 64 the number from which the incoming call was placed. A confirmation signal is sent to the phone 62 to indicate to the caller that the preconnection information has been received. Alternatively, the caller can simply hang up the phone 62 after hearing a couple of rings. The calling card system 64 waits for the ringing from the incoming call to cease. Once the ringing ceases, the number obtained from the ANI information is called by the calling card operator 64. The person who answers the phone 62 is then prompted to enter an identification code. As discussed above, the identification code can be entered in any of a variety of ways. If the entered identification code does not correspond to an authorized account, the identification code is again requested. If the identification code is not correctly entered after multiple attempts, the call is terminated, or otherwise appropriately handled. If it is determined that the entered identification code corresponds to an authorized account, the person who answered the phone 62 is prompted to enter the number that they are attempting to call. The calling card system operator 64 then dials the input number. When the desired party answers the destination phone 60, the call is completed. An account corresponding to the entered identification number is charged according to a predetermined billing system of the calling card system operator 64.

Figure 4:
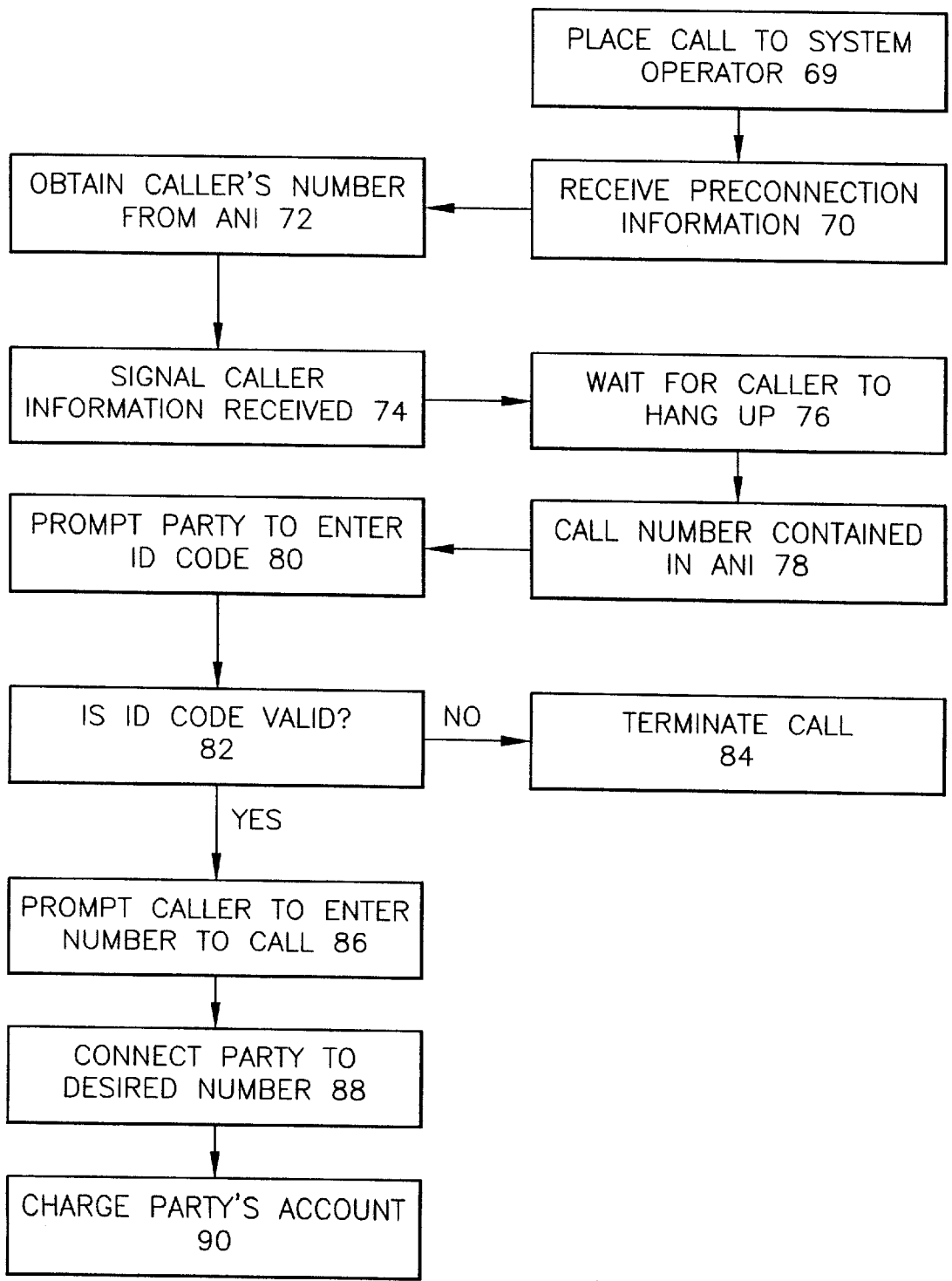
FIG. 4 is a visual representation of a second method embodying the charge minimizing callback method.

FIG. 4 is a visual representation of a second method embodying the charge minimizing callback method. The charge minimizing callback calling card method 14 shown in FIG. 4 involves a procedure for operating a calling card system in accordance with the present invention. In block 69, a call is placed by dialing a number corresponding to the calling card system operator. Once the number is dialed, the preconnection information is received in block 70 by the calling card system operator. As previously discussed and shown in block 72, the ANI code is obtained from the preconnection information received by the calling card system operator. The method of FIG. 4 then proceeds to block 74 wherein a confirmation signal is sent to the phone from which the incoming call was placed to indicate to the caller that the preconnection information has been received by the calling card system. In block 76, the calling card system 64 waits for the ringing from the incoming call to cease. Once the ringing ceases, the method falls to block 78 and the calling card operator places a return call to the number obtained from the ANI information. As represented by block 80, the person who answers the phone is then prompted to enter an identification code. The identification code can be entered in accordance with any of the procedures previously discussed. In decisional block 82, it is determined if the entered identification code is valid. If the identification code does not correspond to an authorized account, the user may be prompted to reenter the identification code. If a correct code is not entered after multiple attempts, the method goes to block 84 and the call is terminated. It should be noted that it is not necessary to terminate the call if the identification code is unauthorized. The call could be referred to a customer service representative or transferred to a different location. If it is determined that the entered identification code corresponds to an authorized account, the method falls to block 86 and the person who answered the phone is prompted to enter the number that they are attempting to call. To connect the caller to the desired party, the calling card system operator then dials the input number as shown in block 88. When the desired party answers the phone, the call is completed. When the call is completed, an account corresponding to the entered identification number is charged according to the billing system of the calling card operator as shown in block 90 of the visual representation of the charge minimizing callback calling card method 14.

Figure 5:
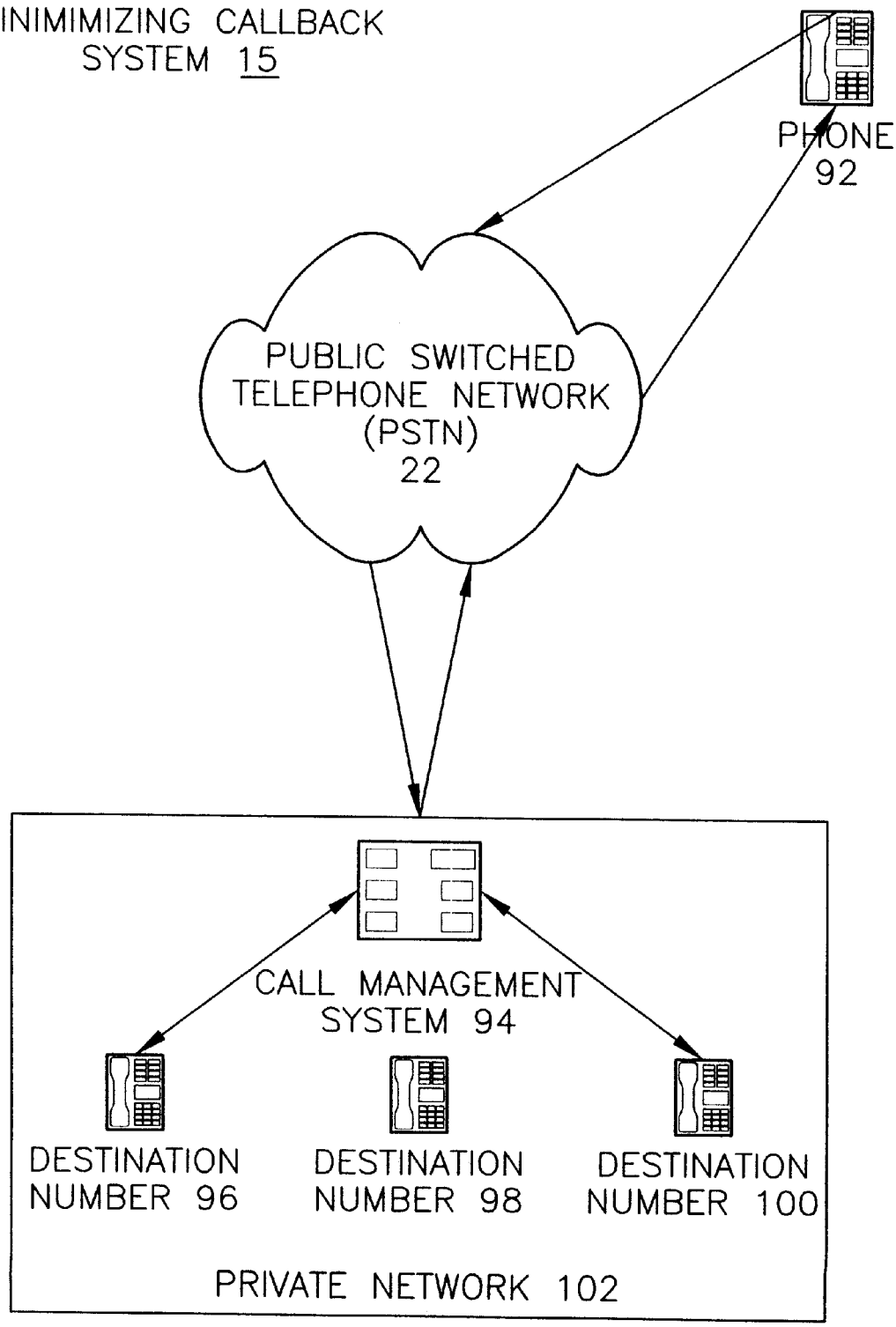
FIG. 5 is a functional diagram of a third embodiment of the charge minimizing callback system.

FIG. 5 is a functional diagram of a third embodiment of the charge minimizing callback system. The embodiment depicts a variation of the embodiment shown in FIG. 1. The private network charge minimizing callback system 15 differs from the charge minimizing callback system 11 depicted in FIG. 1 because the central location telephone 28 has been replaced by a several destination telephones 96, 98 and 100 as is characteristic of a private network 102. The routing of incoming calls is controlled by the call management system 94 which generally consist of a private branch exchange (PBX) or private automatic branch exchange (PABX) used in conjunction with processing means. A call is placed from a phone 92 to a destination 96, 98 and 100 within the private network 102. The destination 96, 98 and 100 could be an individual's desk, a customer service representative, or any other destination in the private network 102. In the interest of simplicity, only three destinations 96, 98 and 100 are shown in FIG. 5. However, it should be appreciated that the possible number of destinations 96, 98 and 100 within a private network 102 is virtually limitless. The preconnection information sent from the PSTN 22 is received by the call management system 94 in response to the incoming call. In accordance with the private network charge minimizing callback system 15 shown in FIG. 5, the call management system 94 records the ANI information, DNIS information and the phone type information. If desired, the phone type information can be examined to determine from what type of phone 92 the incoming call originated. The operator of the system may desire to only utilize the private network charge minimizing call back system 15 in response to an incoming call from a phone 92 that is a pay phone. If it is determined from the phone type preconnection data that the incoming call did not originate from a phone type that warrants using the private network charge minimizing callback system 15, the call is directly connected to the desired destination 96, 98 and 100 indicated by examining the DNIS information. If the incoming call originated from a phone 92 that is a type that warrants use of the private network charge minimizing call back system 15, a confirmation signal is sent to the phone 92 to indicate to the caller that the preconnection information has been received. The call management system 94 then waits for the ringing from the incoming call to cease. Once the ringing ceases, the number obtained from the ANI information is dialed. The person who answers the phone 92 is then prompted to enter an identification code. If the identification code received by the call management system 94 does not correspond to an authorized account after multiple attempts, the call is terminated. If it is determined that the entered identification code corresponds to an authorized account, the call management system 94 sends a signal to the destination 96, 98 or 100 that the DNIS data indicates was the desired destination 96, 98 or 100. The signal, such as a standard telephone ring, informs the person at the desired destination 96, 98 or 100 that an incoming call has been received by the private network charge minimizing callback system 15. When the person at the desired destination 96, 98 or 100 answers the phone, the call is completed.

Figure 6:
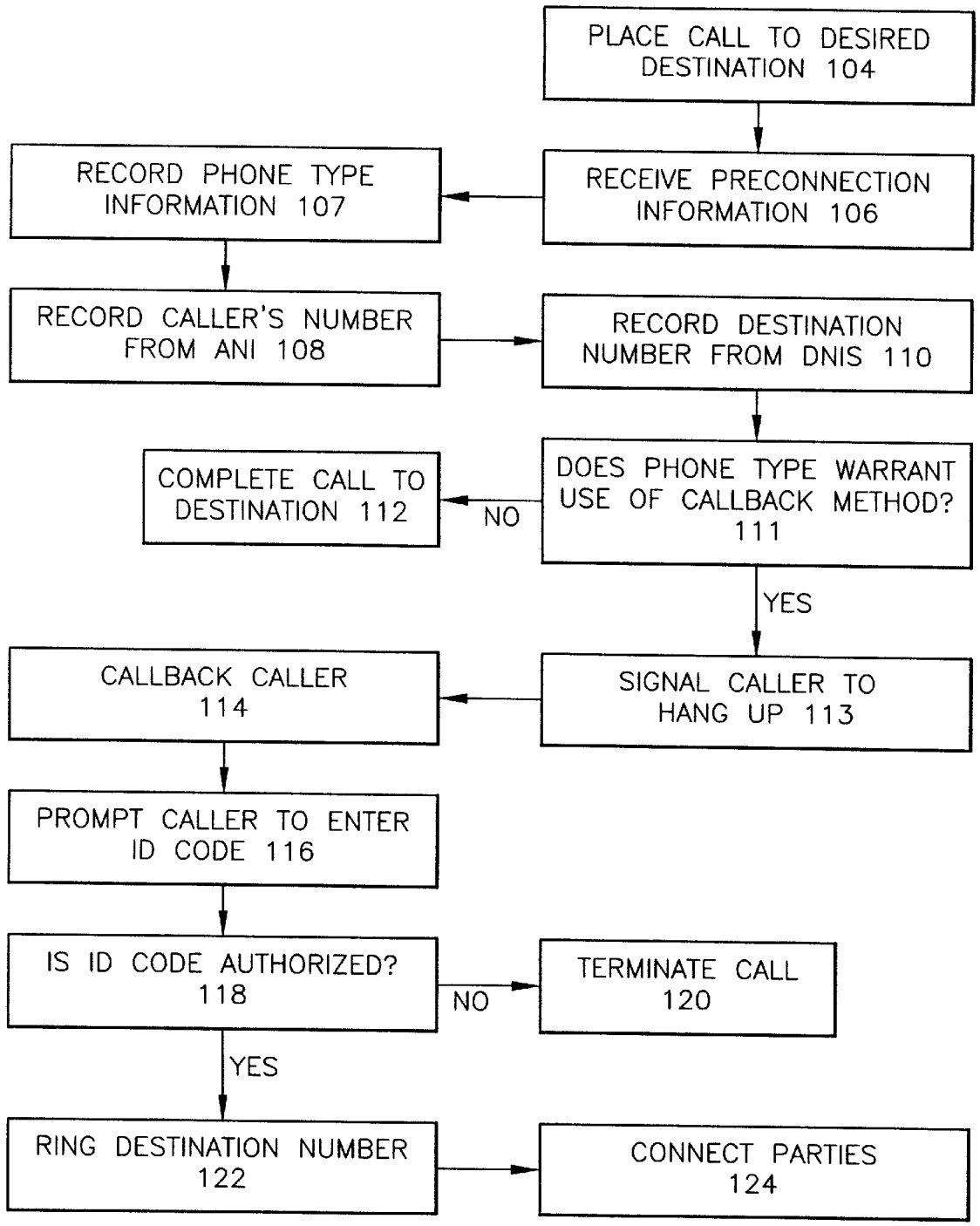
FIG. 6 is a visual representation of a third method embodying the charge minimizing callback method.

FIG. 6 is a visual representation of a third method embodying the charge minimizing callback system. The private network charge minimizing callback method 16 of FIG. 6 commences in block 104 with a call being placed from a phone outside of a private network to a destination inside of the private network. In block 106, the preconnection information is received by a call management system in response to the incoming call. The call management system records the phone type information, block 107, the ANI information, block 108, and the DNIS information, block 110. In decisional block 111, it is determined from the phone type preconnection data whether or not the incoming call originated from a phone type that warrants using the private network charge minimizing callback method 16. If the phone type does not warrant using the charge minimizing callback method 16, the method proceeds to block 112 wherein the incoming call is connected to the desired destination indicated by examining the DNIS information. If the phone type warrants using the private network charge minimizing callback method 16, the method falls to block 113 and a confirmation signal is sent to the phone to indicate to the caller that the preconnection information has been received. The call management system then waits for the ringing from the incoming call to cease. Once the ringing ceases, the number obtained from the ANI information is dialed in block 114. As shown in block 116, the person who answers the phone is then prompted to enter an identification code. In decisional block 118, it is determined whether or not the entered identification code corresponds to an authorized account. If the identification code received by the call management system does not correspond to an authorized account, the call is terminated as shown in block 120. If it is determined that the entered identification code corresponds to an authorized account, the private network charge minimizing call back method 16 falls to block 122 wherein the call management system sends a signal to the destination indicated by the DNIS data. The signal, such as a standard telephone ring, informs the person at the desired destination that an incoming call has been received by the call management system. When the person at the desired destination answers the phone, the call is completed and the parties are connected in block 124.

While specific embodiments of the invention have been described with particularity above, it will be appreciated that the invention comprehends rearrangement and substitution of parts within the spirit of the appended claims.

What is claimed is:

1. A method of minimizing phone charges comprising:
   receiving preconnection information transmitted to a callee's toll free telephone line in response to an incoming call from a caller,
   examining the preconnection information and determining the caller's telephone number without answering the incoming call,
   examining the preconnection information and determining whether or not the incoming call was placed from a pay phone without answering the incoming call,
   completing the call if it is determined that the incoming call was not placed from a pay phone, and
   not completing the incoming call if it is determined the incoming call was placed from a pay telephone, and
   automatically placing a return call by dialing the caller's telephone number,
   prompting the caller to enter an identification code when the caller answers the return call,
   verifying the identification code corresponds to an authorized caller,
   producing an alarm that indicates a return call has been made, and
   completing the call.

2. An apparatus for minimizing telephone charges comprising:
   a telephone line, and
   a digital computer for;
      receiving preconnection information on the telephone line in response to an incoming call from a caller on the telephone line, examining the preconnection information to determine a number corresponding to a telephone from which the incoming call was initiated without answering the incoming call, examining the preconnection information to determine if the call was initiated from a pay phone, answering the incoming phone call if it was not initiated from a pay phone, not answering the incoming call if the incoming call was initiated from a pay phone, and dialing the number corresponding to the telephone from which the incoming call was placed, prompting the caller to input an identification code, receiving an identification code input by the caller and determining the identification of the caller based on the identification code, disconnecting the return call if the identification number is unauthorized, completing the return call if the identification number is authorized, and producing an incoming call notification alarm if the return call was completed.

3. A method of minimizing phone charges on telephone calls made by a caller on a pay phone to a callee, comprising:

receiving preconnection information transmitted to a callee's telephone in response to an incoming call from a caller, examining the preconnection information received on the callee's telephone line and determining the caller's telephone number and whether the incoming call originated from a pay phone without answering the incoming call, if the incoming call originated from a pay phone, disconnecting and not completing the incoming call once the caller's number has been obtained, automatically placing a return call from the callee phone by dialing the caller's telephone number; and producing a return call indication that indicates to the callee that a return call is being automatically placed.

4. The method of claim 3 wherein the step of examining further comprises examining ANI information from the telephone service provider.

5. The method of claim 3 further comprising prompting the caller to enter an identification code upon answering the return call and verifying that the identification code corresponds to an authorized caller.

6. The method of claim 5 further comprising entering the identification code by pressing numbers on the keypad of the caller's telephone corresponding to the identification code.

7. The method of claim 5 further comprising the caller entering the identification code by dialing a number on the caller's telephone corresponding to the identification code.

8. The method of claim 5 further comprising the caller entering the identification code by speaking the identification code into the caller's telephone.

9. The method of claim 3 further comprising completing the incoming call if it is determined that the incoming call was not initiated from a pay phone.

10. The method of claim 3 further comprising configuring the callee's telephone number as a toll free telephone number.

11. The method of claim 4 further comprising blocking or answering the incoming call based on an examination of the ANI information.

12. An apparatus for automatically minimizing phone charges on telephone calls made by a caller to a callee, comprising:

a telephone line, and processing means for;

receiving preconnection information on the telephone line in response to an incoming call from the caller on the telephone line, examining the preconnection information to determine a number corresponding to a telephone from which the incoming call was initiated and the type of the telephone of the caller without answering the incoming call, and wherein the type of the phone being in a group of pay phone, cellular phone, mobile phone or collect call, and if the incoming call originated from a telephone being in the group of pay phone, cellular phone, mobile phone or collect call, not answering the incoming call, and automatically dialing the number corresponding to the telephone from which the incoming call was initiated.

13. The apparatus of claim 12 further comprising means for receiving an identification code input by the caller and determining the identification of the caller based on the identification code.

14. The apparatus of claim 12 wherein the telephone line is a number that will result in a per use charge being charged to the callee in response to an incoming call from a pay phone.

15. The apparatus of claim 12 wherein said processing means produces a signal to indicate that an incoming call was detected and a return call is being placed.

16. The apparatus of claim 12 wherein the processing means is a digital computer.

17. A method of minimizing phone charges comprising:

receiving preconnection information transmitted to a callee's toll free telephone line in response to an incoming call from a caller, examining the preconnection information and determining the caller's telephone number without answering the incoming call, examining the preconnection information and determining whether or not the incoming call was placed from a pay phone without answering the incoming call, completing the call if it is determined that the incoming call was not placed from a pay phone, not completing the incoming call if it is determined the incoming call was placed from a pay telephone, automatically placing a return call by dialing the caller's telephone number, prompting the caller to enter an identification code upon answering the return call, receiving a verification code from the caller and verifying the identification code corresponds to an authorized caller, producing a signal that indicates a return call has been made, and completing the call.

18. An apparatus for minimizing telephone charges comprising:

a telephone line, and a digital computer for;

receiving preconnection information on the telephone line in response to an incoming call from a caller, examining the preconnection information to determine a number corresponding to a telephone from which the incoming call was initiated without answering the incoming call, examining the preconnection information to determine if the call was initiated from a pay phone, answering the incoming phone call if it was not initiated from a pay phone, not answering the incoming call if the incoming call was initiated from a pay phone, and dialing the number corresponding to the telephone from which the incoming call was placed, prompting the caller to input an identification code, receiving an identification code input by the caller and determining the identification of the caller based on the identification code, and connecting the caller to a desired number if the caller is authorized.

19. A method of operating a calling card system comprising:

receiving a telephone call from a caller, examining the preconnection information to determine a telephone number from which the telephone call was made, not answering the telephone call, automatically placing a return call to the telephone number from which the telephone call was received, prompting a party answering the return call to enter an identification code, receiving the identification code, verifying that the entered identification code corresponds to an authorized user, prompting the party answering the return call to enter a telephone number that the party wishes to call, and connecting the party to the telephone number that the party entered.

20. The method of claim 19 further comprising charging an account associated with the identification number a fee.

21. The method of claim 20 wherein the charging is proportional to the amount of time the party is connected to the telephone the party entered.

22. The method of claim 19 wherein receiving the identification code further comprises interpreting the party's speech with a voice recognition system.

23. The method of claim 19 further comprising signaling the caller that the telephone number from which the telephone call was made was received.

24. A method of minimizing domestic phone charges comprising:

receiving preconnection information transmitted to a domestic callee'telephone line in response to an incoming call from a domestic caller, examining the preconnection information received on the domestic callee's telephone line and determining the domestic caller's telephone number and phone type without answering the incoming call, not completing the incoming call if the phone type in a group of pay phone, cellular phone, mobile phone, or collect call that indicates a per use surcharge will be incurred if the incoming call is answered, and automatically placing a return call by dialing the domestic caller's telephone number if the incoming call was not completed.

25. The method of claim 24 further comprising prompting the domestic caller to enter an identification code and verifying that the identification code corresponds to an authorized domestic caller.

26. The method of claim 24 wherein the incoming call was placed from a cellular phone.

27. The method of claim 24 wherein the return call is only placed if it would be less expensive than completing the incoming call.

28. The method of claim 24 further comprising completing the incoming call if it is determined that the incoming call was not initiated from a phone type that indicates a per usage surcharge will be incurred.

29. The method of claim 24 further comprising operating the domestic callee's telephone number as a toll free telephone number.

30. The method of claim 24 further comprising producing an incoming call notification alarm at the domestic callee's location to indicate that a return call is being placed.

31. A method of minimizing phone charges on telephone calls made by a caller on a pay phone to a callee, comprising:

receiving preconnection information transmitted to a callee's telephone in response to an incoming call from a caller;

examining the preconnection information received on the callee's telephone line and determining the caller's telephone number and whether the incoming call originated from a pay phone without answering the incoming call;

if the incoming call originated from a pay phone, disconnecting and not completing the incoming call once the caller's number has been obtained;

automatically placing a return call from the callee phone by dialing the caller's telephone number; and prompting the caller to enter an identification code upon answering the return call and verifying that the identification code corresponds to an authorized caller.

32. The method of claim 31 further comprising entering the identification code by pressing numbers on the keypad of the caller's telephone corresponding to the identification code.

33. The method of claim 31 further comprising the caller entering the identification code by dialing a number on the caller's telephone corresponding to the identification code.

34. The method of claim 31 further comprising the caller entering the identification code by speaking the identification code into the caller's telephone.

* * * * *